US008285720B2

(12) United States Patent  (10) Patent No.: US 8,285,720 B2
Newman et al.  (45) Date of Patent: Oct. 9, 2012

(54) GROUPING OF COMPUTERS IN A COMPUTER INFORMATION DATABASE SYSTEM

(75) Inventors: Gary H. Newman, Concord, MA (US); James W. Franklin, Pepperell, MA (US)

(73) Assignee: Belarc, Inc., Maynard, MA (US)

( * ) Notice: Subject to any disclaimer, the term of this patent is extended or adjusted under 35 U.S.C. 154(b) by 281 days.

(21) Appl. No.: 12/637,985

(22) Filed: Dec. 15, 2009

(65) Prior Publication Data

US 2011/0145239 A1   Jun. 16, 2011

Related U.S. Application Data

(63) Continuation of application No. 10/627,191, filed on Jul. 25, 2003, now Pat. No. 7,657,499.

(60) Provisional application No. 60/460,992, filed on Apr. 7, 2003.

(51) Int. Cl.
G06F 7/00 (2006.01)
G06F 17/30 (2006.01)
(52) U.S. Cl. ........................................ 707/737; 707/752
(58) Field of Classification Search .................... 707/752
See application file for complete search history.

(56) References Cited

U.S. PATENT DOCUMENTS

| | | | |
|---|---|---|---|
| 5,826,000 A | 10/1998 | Hamilton | |
| 5,933,647 A | 8/1999 | Aronberg et al. | |
| 5,983,234 A | 11/1999 | Tiejen et al. | |
| 6,098,067 A * | 8/2000 | Erickson | 1/1 |
| 6,295,527 B1 * | 9/2001 | McCormack et al. | 1/1 |
| 6,789,085 B2 | 9/2004 | Sturms et al. | |
| 6,834,372 B1 | 12/2004 | Becker et al. | |
| 6,947,989 B2 | 9/2005 | Gullotta et al. | |
| 7,085,763 B2 * | 8/2006 | Ochiai et al. | 1/1 |
| 7,197,559 B2 | 3/2007 | Goldstein et al. | |
| 2001/0047485 A1 | 11/2001 | Brown et al. | |
| 2002/0022952 A1 | 2/2002 | Zager et al. | |
| 2003/0093521 A1 * | 5/2003 | Schlonski et al. | 709/224 |
| 2003/0233287 A1 * | 12/2003 | Sadler et al. | 705/28 |
| 2004/0230828 A1 | 11/2004 | DeFuria et al. | |
| 2004/0236728 A1 | 11/2004 | Newman et al. | |

(Continued)

OTHER PUBLICATIONS

"Quick Start Guide for Network Inventory 3.0". EMCO. 2001, pp. 1-117. http://www.emco.is/networkinventory3/nifeatures.html. Access date Feb. 2, 2006.

(Continued)

*Primary Examiner* — Robert Beausoliel, Jr.
*Assistant Examiner* — Michael Pham
(74) *Attorney, Agent, or Firm* — Cesari and McKenna, LLP; Patricia A. Sheehan (57) ABSTRACT

A computer information database system manages computer profile data for a set of computers. A profile group managing server coupled to the database manages the database such that there is a multiple node tree structure of groups for the set of computers in which each node is a group level and a top level is a root, based upon primary grouping criteria that correspond to selected computer profile data. Included in a database mapping table are fields that correspond to ranges of values for computer profile data of interest corresponding to primary grouping criteria including ranges that extend between a selected high and a selected low value. The ranges for any or all of the grouping criteria may be altered. The data in the database can be manipulated to produce summaries and reports of attributes of the computers in a given group.

17 Claims, 5 Drawing Sheets

U.S. PATENT DOCUMENTS

2004/0260952 A1    12/2004    Newman et al.

OTHER PUBLICATIONS

Belarc White Paper (undated) entitled "Belarc's BelManage Capabilities Description", pp. 1-3.
Belarc White Paper dated Mar. 8, 2001, entitled "PC Management for the Internet Age", pp. 1-13.
Belarc's User Guide dated Jun. 27, 2002, pp. 1-20.
Belarc White Paper dated Feb. 9, 2003, entitled "IT as a Utility—Recommendations for Success", pp. 1-7.
Belarc White Paper dated Apr. 1, 2003, entitled "Configuration Based Security", pp. 1-8.

* cited by examiner

| Primary profile value to match | Secondary profile value to match | GroupPath |
|---|---|---|
| 123.040 | NULL | HQ |
| 123.025 | Sls | West/Sales |
| 123.025 | Mkt | West/Marketing |
| 123.026 | Sls | West/Sales |
| 123.026 | Mkt | West/Marketing |
| 123.027 | Sls | West/Sales |
| 123.027 | Mkt | West/Marketing |

| ProfileData Low | ProfileData High | ProfileData2 Low | ProfileData2 High | GroupPath |
|---|---|---|---|---|
| 123.040 | 123.041 | NULL | NULL | HQ |
| 123.025 | 123.027 | Sls | Sls | West/Sales |
| 123.025 | 123.027 | Mkt | Mkt | West/Marketing |

GROUPING OF COMPUTERS IN A COMPUTER INFORMATION DATABASE SYSTEM

CROSS-REFERENCE TO RELATED APPLICATION

The present application claims the benefit of U.S. Provisional Patent Application Ser. No. 60/460,992, which was filed on Apr. 7, 2003, by Gary H. Newman and James W. Franklin for a GROUPING OF COMPUTERS IN A COMPUTER INFORMATION DATABASE SYSTEM, and is hereby incorporated herein by reference.

The present application is a continuation of commonly assigned U.S. patent application Ser. No. 10/627,191, which was filed on Jul. 25, 2003 now U.S. Pat. No. 7,657,499, by Gary H. Newman and James W. Franklin for GROUPING OF COMPUTERS IN A COMPUTER INFORMATION DATABASE SYSTEM and is hereby incorporated by reference.

BACKGROUND OF THE INVENTION

1. Field of the Invention

The invention relates generally to systems and methods of managing profile data for a plurality of personal computers and, more particularly, to systems and methods of grouping personal computer profile data.

2. Background Information

A computer profile includes computer configuration data, such as data that identifies the computer hardware and installed software. The profile may also include other information, such as, for example, associated software license information, performance data, and other user specified data. In a prior system for managing a computer information database that contains computer profile data, a profile group managing server manages the data according to a tree-structured grouping of the computers. The tree structure, which is designated by the system administrator, may, for example, follow the organizational chart of a company, with the top level node, or group, corresponding to the company and lower level nodes, or groups, corresponding to the various branch offices, and so forth. In the example, the computers may be grouped according to IP subnets that correspond to the branch offices. The profile group managing server then manipulates the profile data to produce reports that summarize the attributes of the computers at every group level, with the reports for a given group including the sub-tree that has the group as its root. A user can then utilize the summaries that are of interest. In the example, a user in a particular branch office may be interested only in the information for the computers in that office, and thus, use the reports produced for the branch office group level. However, a user in the company head office may be interested in the information for all of the company computers, and thus, use the reports produced at the company group level. One such computer information database management system is the BelManage system (version 5.1) produced by Belarc, Inc., of Maynard, Mass., which is the Assignee of the current invention.

For certain grouping methods, the prior system uses client software that is configured to explicitly specify the particular groups to which the respective computers are assigned. Thus, client software which is configured for a particular group is installed on each computer that is included in the group. For grouping methods based on Lotus Notes Id, the client software uses the organizational structure of the Lotus Notes e-mail addresses of the primary users. For other grouping methods, the prior system uses client software that is configured for the top level group and a group mapping database table to further map the computers to the various lower-level groups.

The group mapping database table has two fields, namely, a profile value-to-match field that contains values of particular profile data and a group field that identifies the groups into which computers with matching profile data values are to be included. The particular data selected for use as the profile value-to-match depends on possible grouping methods. The grouping method may be based on administrator selected groupings, PC Name, Windows Login, Windows Domain or Workgroup, IP address, and so forth. The profile values-to-match may be, for example, for groupings based on PC Name or Windows Domain the ProfileName or ComputerDomain, respectively. Further, the groupings based on IP subnet may use selected higher order bits of the computer's IP address as the profile value-to-match, and the administrator-selected groupings may use other data included in the profiles as the profile value-to-match.

The profile group managing server determines which group a given computer belongs in by extracting the data of interest from the profile data received from the computer, and consulting the group mapping database table. If the extracted data matches any of the profile value-to-match entries in the table records, the server includes the computer in the group listed in the first record found to contain an exact match. If no matching record is found, the system includes the computer in the topmost group.

In the prior system the administrator changes the group assignment for selected computers either by re-installing properly configured client software on the respective selected computers or, as appropriate, by changing the applicable records in the group mapping database table. When the computers next send their profile data to the profile group managing server, the server manages the data in accordance with the newly defined groups.

While the prior system works well, there is a need for a system with greater flexibility to manage groups in ways that more closely follow the internal organization of a company and/or its computer networks. Accordingly, we have improved the BelManage system as described below.

SUMMARY OF THE INVENTION

The improved system manages computer profile data using primary and secondary grouping criteria. The system can thus select particular computers using the primary grouping criteria and then further refine the selection using otherwise unrelated secondary grouping criteria. As an example, the system may use IP addresses as the primary grouping criteria and domain name as the secondary grouping criteria for certain or all of the IP addresses.

The system uses a group mapping database table that includes profile value-to-match fields for both the primary grouping and the secondary grouping criteria. In the example, the table includes in the primary profile value-to-match field select numbers of the higher order bits of the IP address and in the secondary profile value-to-match field the computer domains names. To assign a computer to a group, the system extracts the data of interest for both the primary and the secondary grouping criteria from the profile data uploaded from the computer, and then queries the table for records that contain matching values in both fields. The entry for the secondary value to match may be set to NULL in a given record if there are no associated secondary grouping criteria.

As discussed in more detail below, the system selects the group for a particular computer based on the particular retrieved records.

The current system also allows the administrator to specify ranges of profile values-to-match for one or both of the primary and the secondary grouping criteria, rather than requiring exact matches. In the example, the administrator may specify ranges within which the IP addresses and/or computer domains must fall for inclusion of a computer in a particular group. To use the ranges, the group mapping database table is expanded to five fields, namely, primary low limit profile value, primary high limit profile value, secondary low limit profile value, secondary high limit profile value and group name. If the primary and/or secondary criteria require an exact match, the corresponding zo low and high limits may be set to the same values. If there are no secondary grouping criteria associated with a particular primary grouping range, the corresponding entries for the secondary low and high limit profile values are set to NULL.

Additional grouping criteria may also be used to further refine the selection of computers for the groups, with additional fields for associated values-to-match or ranges included in the group mapping database table.

The ways in which the computers are grouped can be readily changed by altering the ranges for any or all of the grouping criteria. Similarly, values or ranges for grouping criteria may be added to records in which the corresponding fields were set to NULL, to provide more flexibility in how the computers are grouped. Accordingly, the system administrator is not required to change large numbers of records in the group mapping database table and/or re-install configured client software in large numbers of computers to make the changes.

BRIEF DESCRIPTION OF THE DRAWINGS

The invention description below refers to the accompanying drawings, of which:

FIGS. 4 and 5 are reports produced by the system of FIG. 1; and

DETAILED DESCRIPTION OF AN ILLUSTRATIVE EMBODIMENT

Figure 1:
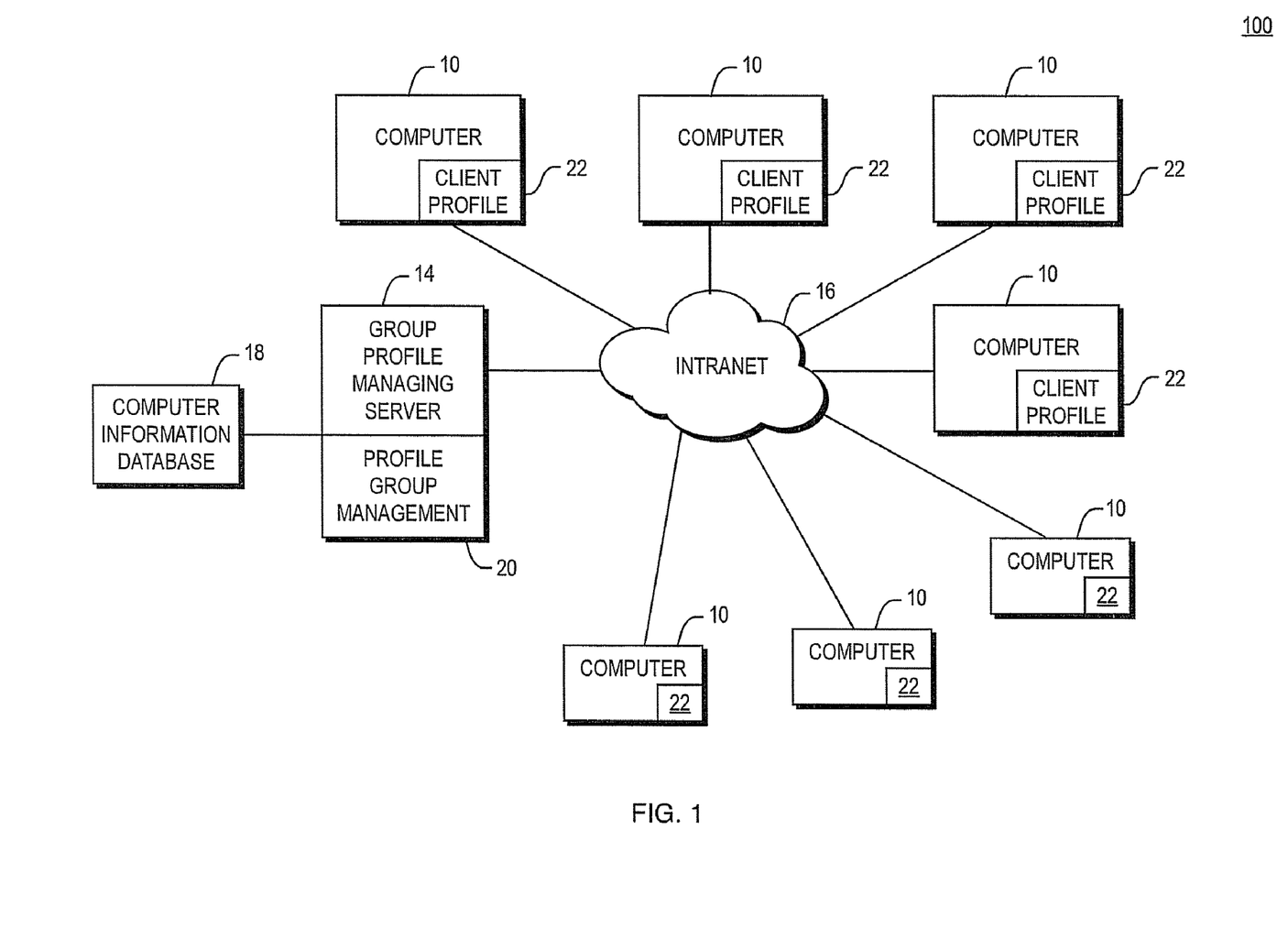
FIG. 1 is a functional block diagram of a system constructed in accordance with the current invention.

Referring now to FIG. 1, a company operates a network 100 that includes various computers 10 comprising a computer-readable storage medium, some of which may be workstations, laptops, servers or other devices (not shown) that communicate over an intranet, which is denoted in the drawing by the reference numeral 16. A server 14, which is the profile group managing server, manages a computer information database 18 that contains the profile data for the computers on the intranet 16 and any other computers (not shown) that are under company control. Hereinafter, all computers under the control of the company are referenced as "computers 10." The server 14 runs profile group management software, which is denoted in the drawing by the reference numeral 20. The server 14 will sometimes be referred to herein as the profile group manager.

The computers 10 run client profile software that, at the respective computers, collects profile data and uploads the data to the profile group managing server 14. The client profile software is denoted in the drawing by the reference numeral 22. The profile group manager 14 manages the computer profile data by grouping the computers into a specified tree-structure of groups, based on primary and/or secondary grouping criteria. The profile group manager then manipulates the data to produce reports that summarize the attributes of the computers in the various groups. The primary and secondary grouping criteria are based on selected methods of grouping, such as IP Address, Windows Domain, Windows Login, PC Name and so forth. As discussed in more detail below, the grouping criteria may be selected essentially to correspond to the underlying organization of the network 100 and/or the company.

Figure 2:
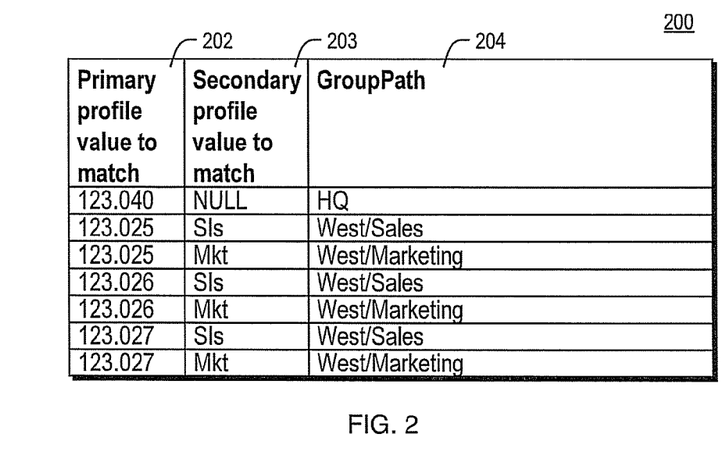
FIG. 2 is a group mapping database table for use by the system of FIG. 1.

Referring now also to FIG. 2, the profile group manager uses a group mapping database table 200 to map the computers to the appropriate group based on primary and secondary grouping criteria. The mapping table 200 includes three fields, namely, a primary profile value to match field 202, a secondary profile value to match field 203 and a group path field 204. The group path field 204 contains paths from the company level, that is, paths in which the top or company level is implied. As shown in the drawing, entries for secondary grouping criteria values may be set to NULL when there is no conesponding secondary grouping criteria associated with a given primary grouping criteria. To include a computer in a group, the system extracts from the uploaded profile the data that corresponds to the primary grouping criteria and the secondary grouping criteria. The system then queries the group mapping database table for records that match the extracted data. The system also includes in the query the condition that the secondary low value to match may be NULL, such that NULL acts as a wildcard. The operations of the system are discussed in more detail below with reference to FIG. 6.

Figure 3:
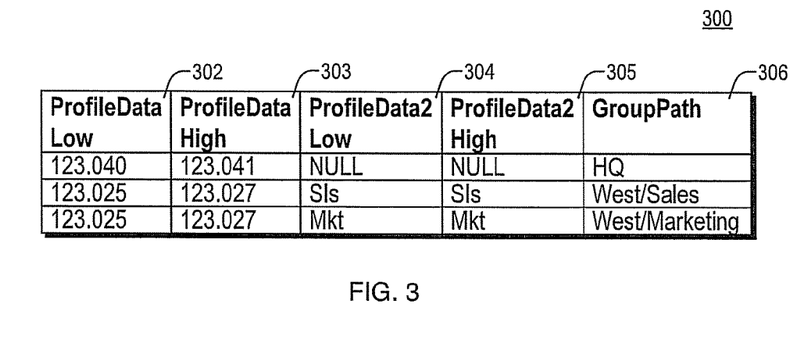
FIG. 3 is a an alternative group mapping database table for use by the system of FIG. 1.

Referring now also to FIG. 3, the primary and/or secondary grouping criteria may include ranges of values, such as ranges of IP addresses. Accordingly, the profile group manager may use a group mapping database table 300 that includes five fields 302-306. Two of the fields, namely, a Profile Data Low field 302 and a Profile Data High field 303, define the range of profile values of interest that correspond to the primary grouping. In the example depicted in the drawing, the Profile Data Low and Profile Data High fields denote ranges of values for the IP addresses. The two fields Profile Data2 Low 304 and Profile Data2 High 305 set a range for the profile values of interest that correspond to the secondary grouping criteria. In the example, the fields 304 and 305 denote Computer Domain names. The field 306 includes information that identifies the group, in the example, the field 306 includes the paths to the respective groups from the company level. As shown, the high and low values for a given grouping may be equal, such that the profile data of interest must be an exact match for inclusion of the computer in the corresponding group. Also as shown, there may be no corresponding secondary criteria for certain primary grouping criteria, and the entries in secondary value fields 304 and 305 are then set to NULL in the applicable table records.

When a grouping method based on IP address uses high and low limits, the system preferably uses the entire address as the data of interest, rather than just selected most significant bits. In addition, the IP address is preferably formatted with leading zeros on the octets for use in the database query. The address commonly shown as 10.2.3.4 is formatted as 010.002.003.004, so that database dictionary sorting order comparisons provide the correct numerical comparisons. Further, the low and high limits for the grouping should also be formatted with leading zeros.

Figure 5:
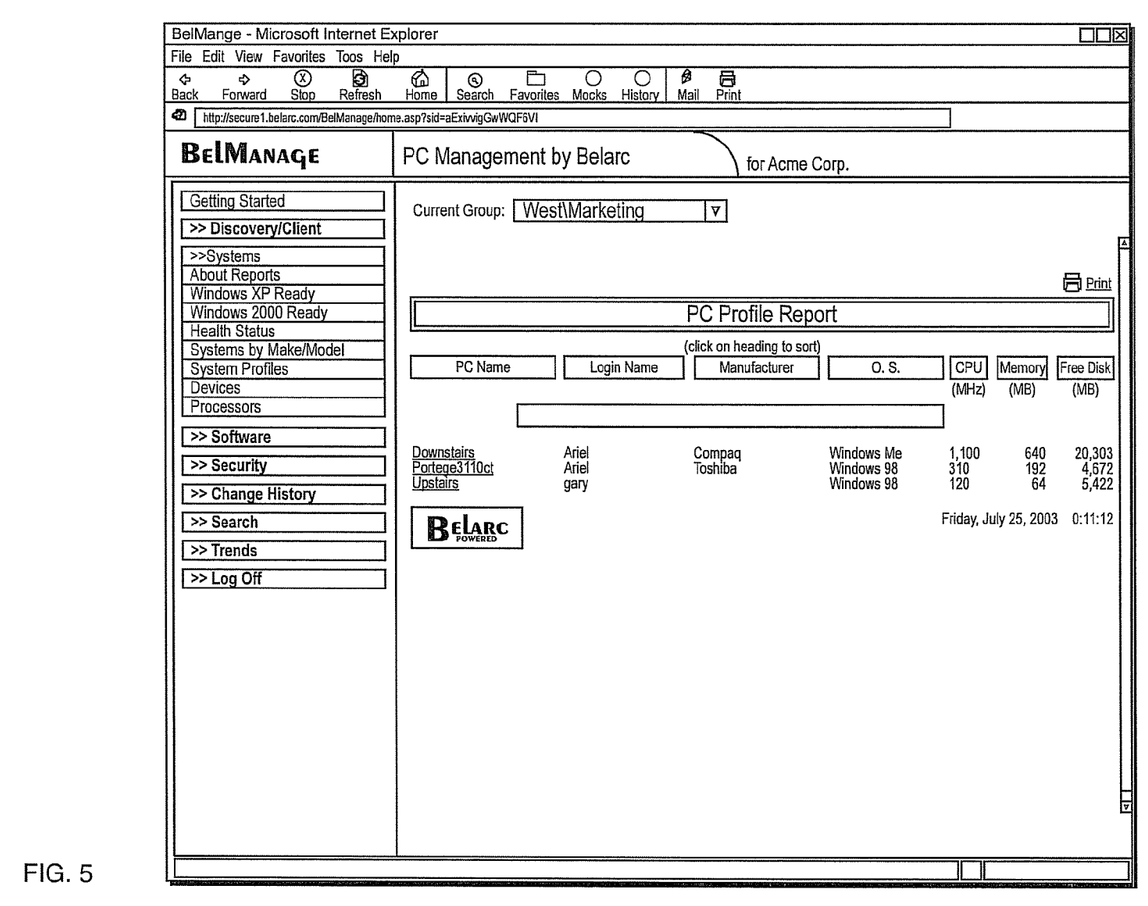

Referring now also to FIG. 4, a profile report 400 contains summaries of various profile data for the computers that are included in the sub-tree with the group West as the root, namely, the groups West, West/Sales, and West/Marketing. The report may instead be written for a lower-level group, as shown in FIG. 5. Other reports are created to summarize various other attributes of the computers at the various group levels, such as, types and counts of hardware devices, quantities of licensed software, and so forth.

To provide the profile data, the client profile software 22 on a given computer 10 collects hardware and software configuration and performance data from various registries, files, menus and so forth. The data includes:

Hardware component information such as manufacturer, system, BIOS, CPU, bus, memory, hard disks (local and shared, logical and physical), tape drives, video cards, sound cards, printers, network, and operating system;

Software version information about applications including manufacturer, product name, version number, and install directory;

Software License information about popular software packages installed on each computer, including Product Ids and Registration Numbers;

Login account list of local logins the computer allows and date of last login for each.

Performance data such as network activity, CPU utilization, number of reboots, and hard drive SMART failures;

Microsoft hotfixes; and

User Defined Entries such as name, address, phone number, location.

At designated times, the client computers connect to the profile group manager 14 over the intranet 16 or, as appropriate, over the internet, and upload the collected data, or profiles.

Figure 6:
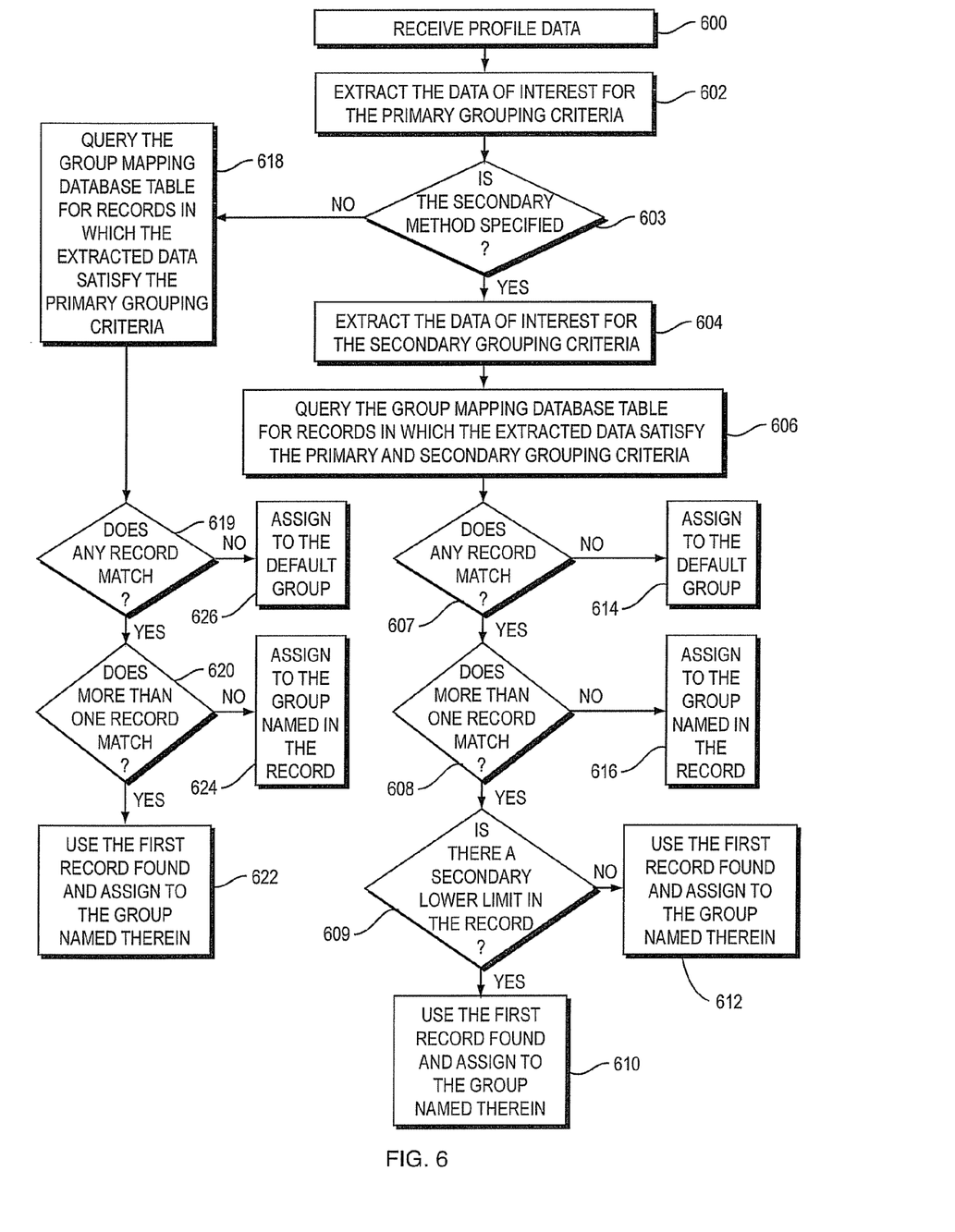
FIG. 6 is a flow chart of the operations of the system of FIG. 1.

Referring now also to FIG. 6, when the profile group manager receives a profile from a client (step 600), the profile group manager extracts data of interest based on a specified primary grouping method (step 602). The extracted data is referred to hereinafter as "firstData." If no secondary grouping method is specified (step 603), the profile group manager queries the group mapping database table for records in which the primary low limit is less than or equal to firstData and the primary high limit is greater than or equal to firstData (steps 603, 618). In response to the query, the system returns matching records in database order. If the query returns a single record, the profile group manager includes the computer in, that is, associates the profile data with, the group listed in the record (steps 619, 620, 624). If more than one record is returned, the profile group manager uses the first record found (steps 620, 622). If the query does not find any matching records, the profile group manager includes the computer in a default group (steps 619, 626). The default group may, for example, be the top level group.

If a secondary grouping method is specified, the profile group manager extracts the applicable data of interest (steps 603, 604). The extracted value is referred to hereinafter as "secondData." The profile group manager then queries the table for records in which the primary low limit is less than or equal to firstData and the primary high limit is greater than or equal to firstData, and the secondary low limit is less than or equal to secondData and the secondary high limit is greater than or equal to secondData. In addition, the profile group manager queries the table for records in which both the primary low limit is less than or equal to firstData and the primary high limit is greater than or equal to firstData and the secondary low limit is NULL or the empty string (step 606). This last check allows NULL and the empty string to be used as wildcards for the secondary grouping criteria.

If the query returns a single record, the profile group manager includes the computer in the group listed in the record (steps 607, 608, 616). If, however, the query returns more than one record, the profile group manager uses the first record found that has a secondary low limit (steps 608-610). Otherwise, if none of the returned records have secondary low limits, the manager uses the last record returned (steps 609, 612). The last record presumably includes primary grouping criteria that is set to a "catch all" range. If the query does not find any matching records, the system includes the computer in the default group (steps 607, 614).

We further explain the system operations by way of examples. As a first example, a company operates its headquarters on one IP subnet and its sales and marketing divisions on a second IP subnet. The group mapping database table used by the system is shown in FIG. 3. The profile group manager manages the network computers 10 using as the primary grouping criteria ranges of IP addresses and as the secondary grouping criteria computer domains. The reports thus organize the computers in the following groups:

Company/HQ
Company/West/sales
Company/West/marketing.

As discussed, the system uses a default group for computers that do match any of the grouping criteria. These computers may be included in the reports as, for example, the group Company/ungrouped. As desired, the system may also produce separate reports for the two subnets and/or the two divisions, as well as for the entire company.

In another example, the company uses several IP subnets and for each subnet the same set of computer domains. The subnets may, for example, operate in various factories that each have manufacturing, sales and marketing divisions. The system again uses IP addresses as the primary grouping criteria and computer domain as the secondary grouping criteria. The profile group manager includes the computers in the groups Company/subnet 1/mfg
Company/subnet 1/mkt
Company/subnet 1/sls
Company/subnet 2/mfg
Company/subnet 2/mkt
Company/subnet 2/sls
etc.

In yet another example, the grouping mimics both a company's organizational structure and its underlying physical set up. The company uses structured PC Names that include three letters followed by four digits. The three letters denote the organizational responsibilities of the computer's user, and the numbers make the name unique. The three letters may be "sls" for sales, "mkt" for marketing, and so forth.

The PC Name is the primary grouping criteria and thus reflects the company's organization. To provide separate groups for east and west regional sales manager and marketing managers, the IP Address may be used as the secondary grouping criteria. The profile group manager then groups the computers into Company/Sales/West
Company/Sales/East
Company/Marketing/West
Company/Marketing/East The profile group manager then produces reports organized by the company, by sales and marketing groups and by regional groups. As discussed, the reports for a given group include the sub-tree with the group as the root. The head of marketing, for example, will want reports for all of marketing and thus use the marketing group level, while a regional manager may want reports for only his region and use the regional group level.

What is claimed is:

1. A method of operating a profile group managing server for managing a computer information database, comprising:
   receiving, at said profile group managing server, from one or more computers in a set of computers, for inclusion in the computer information database, computer profile data from the set of computers;
   determining, by said profile group managing server, a multiple node tree structure of groups for the set of computers in which each node is a group level and a top level is a root, based upon primary grouping criteria that correspond to selected computer profile data;
   including, in a database mapping table, fields for the primary grouping criteria that correspond to ranges of values of computer profile data of interest that are utilized as the primary grouping criteria to assign the computers to groups, and including in those fields, in respective table records, high and low values for the computer profile data of interest, the table further including, in the records, information that identifies the groups to which the computers that satisfy the primary grouping criteria are assigned, said primary grouping criteria being ranges that extend between a selected high and a selected low value as follows:
      wherein said ranges are inclusive and include the high value, the low value, and values therebetween, wherein said values therebetween include all values that are less than the high value, but greater than the low value,
      wherein said ranges are inclusive and include the high value and the values therebetween, wherein said values therebetween include all values that are less than the high value, but greater than the low value,
      wherein said ranges are inclusive and include the low value and the values therebetween, wherein said values therebetween include all values that are less than the high value, but greater than the low value, or
      wherein said ranges are inclusive and only include values therebetween, wherein said values therebetween include all values that are less than the high value, but greater than the low value;
   specifying, in the respective table records, information that identifies groups to which the computers that satisfy the primary grouping criteria are assigned; and
   manipulating the computer profile data from the database and producing for a selected group level, reports that contain summaries of certain or all of the attributes of the computers that are in the selected group level or below in the multiple node tree structure.

2. The method as defined in claim 1 further comprising:
   for the computer profile data received from a given computer, the profile group managing server performs the following:
   extracting the selected computer profile data that are utilized in the primary grouping criteria;
   querying the group mapping table to determine if the extracted computer profile data corresponds to or falls within the ranges of the values that are included in the one or more fields of the primary grouping criteria in any of the records in the group mapping table; and
   if the querying provides query results with no records, assigning the computer to a default group;
   if the querying provides query results with one table record, assigning the computer to the group that is named in the record;
   if the querying provides query results with multiple table records that include a secondary low value, assigning the computer to the group that is named in the record that is in a first predetermined position in an order in which the records are returned; and
   if the querying provides query results with multiple records and there is no corresponding secondary low value in the records, assigning the computer to the group that is named in the record that is in a second predetermined position in an order in which the records are returned.

3. The method as defined in claim 1 wherein the primary grouping criteria correspond to user-specified values of the selected computer profile data.

4. The method as defined in claim 1 wherein the first predetermined position in the order of records is the first record found and the second predetermined position in the order of records is the last record found.

5. The method as defined in claim 1 wherein the assigning further comprises re-grouping the set of computers in groups in accordance with different user-specified primary grouping criteria by altering the ranges.

6. The method as defined in claim 5 wherein the assigning further comprises grouping the set of computers in groups in accordance with different user-specified primary grouping criteria that correspond to computer profile data that represents selected physical locations of users.

7. The method as defined in claim 1 wherein the assigning further comprises grouping the set of computers in groups according to primary grouping criteria that correspond to computer profile data that represents selected structures within the underlying organization of users.

8. The method as defined in claim 7 wherein the assigning further comprises re-grouping the set of computers in groups in accordance with primary grouping criteria that correspond to other selected structures within the underlying organization of a company.

9. A system of operating a profile group managing server comprising:
   a processor and memory in said profile group managing server, said profile group managing server managing an associated database containing computer profile data about computers in a set of computers;
   the memory having computer instructions configured to:
   receive, at said profile group managing server, from one or more computers in the set of computers, for inclusion in the computer information database, computer profile data;
   determine, by said profile group managing server, a multiple node tree structure of groups for the set of computers in which each node is a group level and a top level is a root, based upon primary grouping criteria that correspond to selected computer profile data;
   include, in a database mapping table, fields for the primary grouping criteria that correspond to ranges of values of computer profile data of interest that are utilized as the primary grouping criteria to assign the computers to groups, and including in those fields, in respective table records, high and low values for the computer profile data of interest, the table further including, in the records, information that identifies the groups to which the computers that satisfy the primary grouping criteria are assigned, said primary grouping criteria being ranges that extend between a selected high and a selected low value as follows:
- wherein said ranges are inclusive and include the high value, the low value, and values therebetween, wherein said values therebetween include all values that are less than the high value, but greater than the low value,
- wherein said ranges are inclusive and include the high value and the values therebetween, wherein said values therebetween include all values that are less than the high value, but greater than the low value,
- wherein said ranges are inclusive and include the low value and the values therebetween, wherein said values therebetween include all values that are less than the high value, but greater than the low value, or
- wherein said ranges are inclusive and only include values therebetween, wherein said values therebetween include all values that are less than the high value, but greater than the low value;

specify, in the respective table records, information that identifies groups to which the computers that satisfy the primary grouping criteria are assigned; and manipulate the computer profile data from the database and producing for a selected group level, reports that contain summaries of certain or all of the attributes of the computers that are in the selected group level or below in the multiple node tree structure.

10. The system as defined in claim 9 further comprising hardware component information including one or more of manufacturer, system BIOS (basic input/output system), CPU (computer processing unit), bus, memory, hard disks, local and shared, logical and physical, tape drives, video cards, sound cards, printers, network and operating systems.

11. The system as defined in claim 9 wherein said software version information about applications including one or more of manufacturer, product name, activity, CPU (computer processing unit) utilization, number of reboots, and hard drive SMART (self-monitoring, Analysis and Reporting Technology) failures.

12. The system as defined in claim 9 wherein said group profile managing server organizes the set of computers to reflect the organization of the company, and underlying physical setup by using identifiers including at least one PC (personal computer) Name and corporate department including one of sales, marketing, headquarters and location.

13. The system as defined in claim 9, wherein said computer profile data includes one or more of hardware and software configuration, hot fixes, user defined entries and performance data.

14. The system as defined in claim 9, further comprising re-grouping the set of computers in groups in accordance with different user-specified primary grouping criteria by altering the ranges.

15. A non-transitory computer-readable storage medium containing a program instructions executing on a processor, the non-transitory computer readable medium comprising:
program instructions that direct the processor to:
- receive from one or more computers in a set of computers, for inclusion in the computer information database, computer profile data from the set of computers;
- determine a multiple node tree structure of groups for the set of computers in which each node is a group level and a top level is a root, based upon primary grouping criteria that correspond to selected computer profile data;
- include in a database mapping table, fields for the primary grouping criteria that correspond to ranges of values of computer profile data of interest that are utilized as the primary grouping criteria to assign the computers to groups, and including in those fields, in respective table records, high and low values for the computer profile data of interest, the table further including, in the records, information that identifies the groups to which the computers that satisfy the primary grouping criteria are assigned, said primary grouping criteria being ranges that extend between a selected high and a selected low value as follows:
  - wherein said ranges are inclusive and include the high value, the low value, and values therebetween, wherein said values therebetween include all values that are less than the high value, but greater than the low value,
  - wherein said ranges are inclusive and include the high value and the values therebetween, wherein said values therebetween include all values that are less than the high value, but greater than the low value,
  - wherein said ranges are inclusive and include the low value and the values therebetween, wherein said values therebetween include all values that are less than the high value, but greater than the low value, or
  - wherein said ranges are inclusive and only include values therebetween, wherein said values therebetween include all values that are less than the high value, but greater than the low value;
- specifying, in the respective table records, information that identifies groups to which the computers that satisfy the primary grouping criteria are assigned;
- manipulating the computer profile data from the database and producing for a selected group level, reports that contain summaries of certain or all of the attributes of the computers that are in the selected group level or below in the multiple node tree structure.

16. The non-transitory computer-readable storage medium as defined in claim 15 further comprising re-grouping the set of computers in groups in accordance with different user-specified primary grouping criteria by altering the ranges.

17. The non-transitory computer-readable storage medium as defined in claim 16 further including program instructions that direct the processor to:
- extract the selected computer profile data that are utilized in the primary grouping criteria;
- query the group mapping table to determine if the extracted computer profile data correspond to or fall within the ranges of the values that are included in the one or more fields of the primary grouping criteria and the one or more fields of in any of the records in the group mapping table; and
- if the querying provides query results with no records, assigning the computer to a default group;
- if the querying provides query results with one table record, assigning the computer to the group that is named in the record;
- if the querying provides query results with multiple table records that include a secondary low value, assigning the computer to the group that is named in the record that is in a first predetermined position in an order in which the records are returned; and
- if the querying provides query results with multiple records and there is no corresponding secondary low value in the records, assigning the computer to the group that is named in the record that is in a second predetermined position in an order in which the records are returned.

* * * * *

UNITED STATES PATENT AND TRADEMARK OFFICE
CERTIFICATE OF CORRECTION

PATENT NO.       : 8,285,720 B2
APPLICATION NO.  : 12/637985
DATED            : October 9, 2012
INVENTOR(S)      : Gary H Newman It is certified that error appears in the above-identified patent and that said Letters Patent is hereby corrected as shown below:

Col. 3, line 15, delete "zo";
Col. 4, line 27, delete "conesponding" and add --corresponding--;
Col. 10, line 28, delete "specifying" and add --specify--; and
Col. 10, line 31, delete "manipulating" and add --manipulate--.

Signed and Sealed this
Twelfth Day of February, 2013

Teresa Stanek Rea
*Acting Director of the United States Patent and Trademark Office*